Patented Apr. 1, 1947

2,418,181

UNITED STATES PATENT OFFICE 2,418,181

STEROIDAL HORMONE INTERMEDIATES

Russell Earl Marker, Mexico City, Mexico, assignor to Parke, Davis & Company, Detroit, Mich., a corporation of Michigan No Drawing. Original application February 5, 1940, Serial No. 317,419. Divided and this application May 24, 1944, Serial No. 537,192

4 Claims. (Cl. 260—397.3)

This invention relates to steroidal hormone intermediates and preparation of the same, and, more particularly, to the preparation of new steroidal sapogenin derivatives useful as intermediates for the manufacture of hormones.

This application is a division of my copending application, Serial No. 317,419, filed February 5, 1940.

One of the objects of this invention is to prepare new steroidal sapogenin derivatives which can readily be converted to pregnane derivatives.

In my copending application, Serial No. 393,667, filed May 15, 1941, I have set forth the preparation of new sapogenin derivatives which I designate as pseudo-sapogenins and have also set forth the manner in which the pseudo-sapogenins may be oxidized to form $\Delta^{16}$-20-ketopregnene compounds, i. e. steroids having in ring D the structure

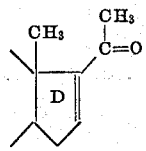

In my copending application, Serial No. 393,668, filed May 15, 1941 (now Patent No. 2,291,643, issued August 4, 1942) I have disclosed and claimed a certain group of $\Delta^{16}$-20-keto-pregnene compounds which are easily prepared from the readily available sarsasapogenin.

In the parent application, Serial No. 317,419 I have disclosed and claimed another valuable group of $\Delta^{16}$-20-keto-pregnene compounds having at $C_3$ and at one of $C_2$ and $C_6$, a member of the class consisting of —OH and groups hydrolyzable to —OH.

The compounds of the instant divisional application are 20-keto-pregnenes having at $C_3$, $C_6$ and $C_{20}$, keto groups or groups capable of hydrolysis to keto groups.

The compounds of this invention may be obtained, for example, from the known sapogenins, chlorogenin, diosgenin and gitogenin which differ from one another only in regard to the connections between rings A and B, the degree of saturation of the ring system and the number of substituents attached to these rings.

The structures of rings A and B of these compounds are shown below:

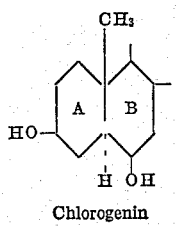
Chlorogenin

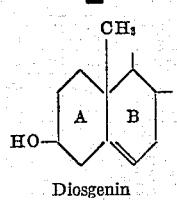
Diosgenin

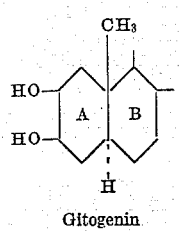
Gitogenin

The invention is illustrated by the following examples.

Example 1

(a) A mixture of 2.5 grams of chlorogenin and 30 cc. of acetic anhydride is heated at 200° for 10 hours. The acetic anhydride is then evaporated in vacuo and the sirupy residue hydrolyzed with hot alcoholic potassium hydroxide. The small white crystals which separate on dilution are collected and washed well with alcohol. The product thus obtained is pseudo-chlorogenin and after recrystallization from acetone has the M. P. 268–270° C. It gives a large depression with a sample of chlorogenin. The substance is very sparingly soluble in acetone, ethyl acetate, ether, alcohol and similar solvents.

(b) 2 grams of pseudo-chlorogenin as thus prepared are dissolved in 300 cc. of acetic acid and a solution of 2 grams of chromic anhydride in 20 cc. of 80% acetic acid is added at room temperature. After standing for about an hour, a small amount of alcohol is added and most of the acetic acid removed by vacuum distillation. The residue is dissolved in ether and washed well with water and dilute sodium hydroxide solution. The ethereal extract is evaporated to dryness on a steam bath and the residue recrystallized from alcohol. Thus there is obtained crystals of $\Delta^{16}$-allo-pregnenetrione-3,6,20, M. P. 226° C.

(c) Five-tenths of a gram of $\Delta^{16}$-pregnenetrione-3,6,20 is dissolved in 100 cc. of acetic acid and shaken in the presence of 0.5 gram of Adams' platinum oxide catalyst in a hydrogen atmosphere at about 40 lbs. pressure for 3 hours. Then the catalyst is removed by filtration and the acetic acid evaporated in vacuo. The residue may be crystallized from acetone to give allo-pregnanetriol-3,6,20 as white crystals. On oxidation with an equal weight of chromic anhydride in acetic acid solution at room temperature and working up the product, there is obtained allo-pregnanetrione-3,6,20 of M. P. 235° C.

Example 2

(a) A mixture of 2 grams of diosgenin, 30 cc. of benzoyl chloride and 15 grams of freshly fused sodium acetate is heated in an oil bath at 220° C. for 10 hours. Then the mixture is distilled in vacuo until no more distillate can be collected at 200° C. and 10 mm. pressure. The residue in the distilling flask is cooled and alcoholic sodium hydroxide solution is added. After warming for one-half hour, the mixture is diluted with water and ether, and the layers separated. The ethereal layer is washed with water and dilute sodium hydroxide and then evaporated to dryness on a steam bath. This residue is pseudo-diosgenin. It may be purified by crystallization from slightly diluted alcohol and is thus obtained as white crystals which readily decolorize bromine in acetic acid.

(b) One gram of pseudo-diosgenin is dissolved in 100 cc. of acetic acid. Five cc. of sulfuric acid are added and then in small portions, and with constant stirring, there is added 1 gram of powdered potassium permanganate. After stirring for 6 hours at room temperature, sulfur dioxide is passed into the mixture with cooling until the solution is nearly colorless. The mixture is concentrated in vacuo to a small volume and then diluted with water and ether extracted. The ethereal layer is washed well with dilute alkali and water, and evaporated to dryness. The yellow residue may be recrystallized from acetone to give yellow crystals of $\Delta^{4,16}$-pregnadiene-trione-3,6,20.

(c) To 200 mgs. of the above $\Delta^{4,16}$-pregnadienetrione-3,6,20 in 10 cc. of acetic acid is added 500 mgs. of zinc dust and the mixture heated for 1 hour on the steam bath. The mixture is diluted with water and extracted with ether and the ethereal extract washed well with water and dilute alkali. The ether is removed on the steam bath and the residue crystallized from slightly diluted methanol. This product is allo-pregnanetrione-3,6,20.

The new compounds of this invention may be represented generally by the following formula

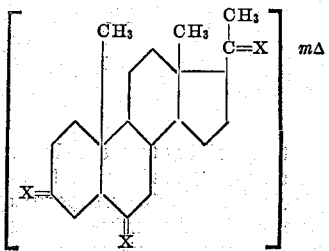

where $X$ is $=0$, where $m$ is an integer having one of the values 0, 1 and 2 and $\Delta$ represents a double bond in the ring system at one or more of the positions 4 and 16.

What I claim as my invention is:

1. A steroid of the class consisting of $\Delta^{16}$-allopregnenetrione-3,6,20; $\Delta^{4,16}$-pregnadienetrione-3,6,20; and allo-pregnanetrione-3,6,20.
2. $\Delta^{16}$-Allo-pregnenetrione-3,6,20.
3. $\Delta^{4,16}$-Pregnadienetrione-3,6,20.
4. Allo-pregnanetrione-3,6,20.

RUSSELL EARL MARKER.

REFERENCES CITED

The following references are of record in the file of this patent:

Reichstein, "Helv. Chim. Acta," vol. 21, pages 161–71 (1938).